Feb. 23, 1926. 1,574,423
W. G. HAGMAIER
RIFT SPLITTER
Filed April 13, 1922
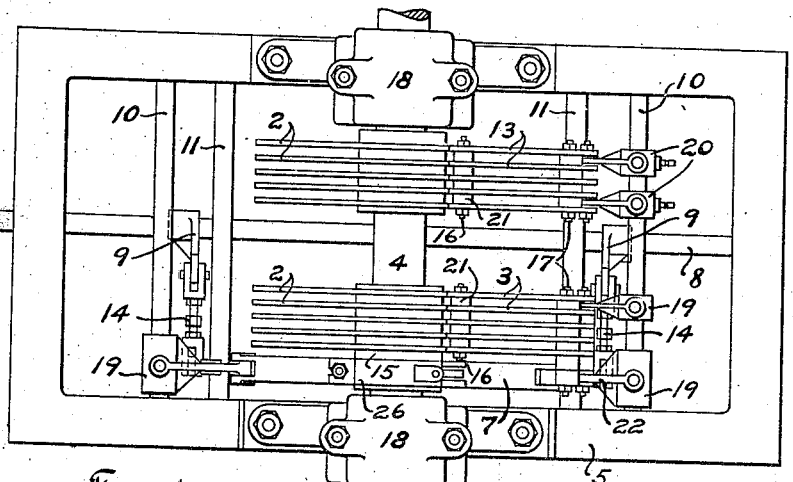
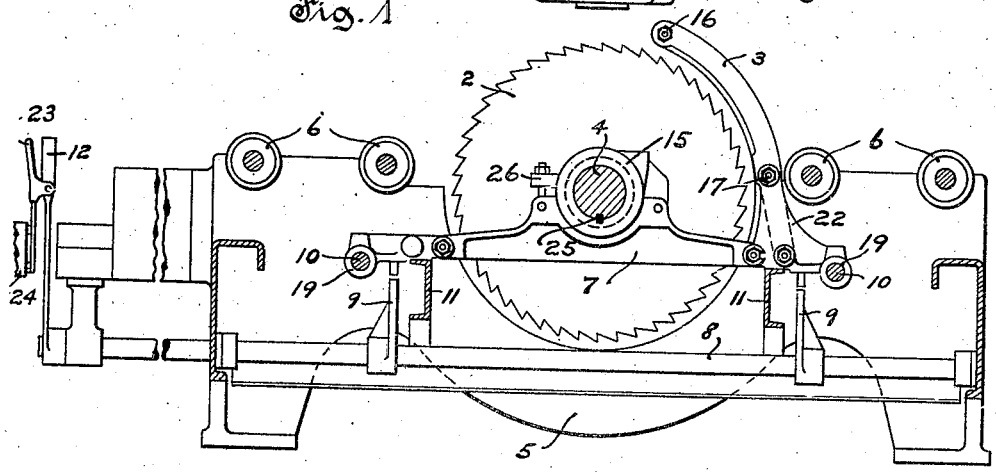
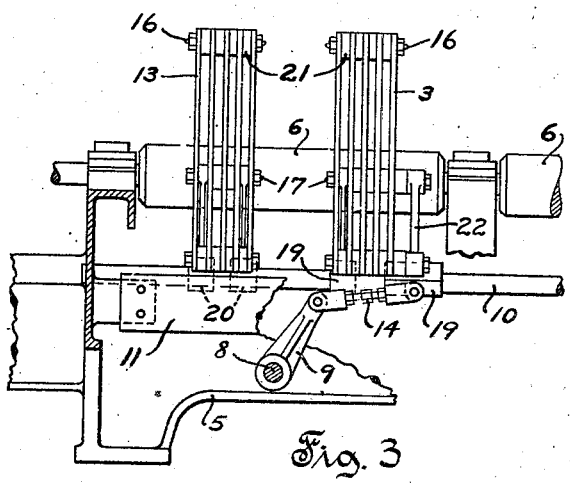
Inventor
W. G. Hagmaier
by
Attorney Patented Feb. 23, 1926.

1,574,423

UNITED STATES PATENT OFFICE.

WILLIAM G. HAGMAIER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

RIFT SPLITTER.

Application filed April 13, 1922. Serial No. 552,159.

*To all whom it may concern:*

Be it known that WILLIAM G. HAGMAIER, a citizen of the United States, residing at West Allis, in the county of Milwaukee and State of Wisconsin, has invented a certain new and useful Improvement in Rift Splitters, of which the following is a specification.

This invention relates in general to improvements in saw mill machinery, and relates more specifically to improvements in the construction and operation of mechanism especially adapted for cooperation with gang saws of the circular type.

An object of the invention is to provide spreader mechanism cooperable with circular saws and the like, which is simple in construction and efficient in operation.

It is common practice in operating saw mills, to first saw a log into cants of relatively great thickness, and to subsequently saw these cants into boards of desirable thickness with the aid of a gang of saws. The gangs of saws ordinarily employed for this purpose, are of a circular type, each saw being preferably supported from an arbor by means of a collar. It has also been found desirable in the operation of gang saws to provide spreader means for separating the adjacent boards and for preventing these boards from engaging the saw blades, these spreader mechanisms being ordinarily termed "rift splitters."

The present invention has for its object to provide improvements in rift splitter mechanisms which will effectively prevent the boards from binding against the saw blades and which will not interfere with desirable adjustments of the saws.

A clear conception of an embodiment of the invention and of the operation of devices constructed in accordance therewith may be had by referring to the drawing accompanying and forming a part of this specification in which like reference characters designate the same or similar parts in the several views.

Fig. 1 is a top view of a gang of circular saws some of which are laterally adjustable while others are not, all of the saws being provided with improved rift splitter mechanisms.

Fig. 2 is a part sectional side elevation of a gang saw machine showing details of the saw and rift splitter adjusting mechanism embodied in the machine.

Fig. 3 is a fragmentary sectional end view of an improved rift splitter or spreader mechanism.

The sawing machine specifically illustrated in the drawing comprises a main frame 5 having bearings 18 associated therewith, a horizontal saw arbor 4 rotatably supported in the bearings 18, a gang of circular saws 2 rotatably supported concentric with the arbor 4 by means of saw collars 15, a plurality of feed rollers 6 for conveying timber toward and away from the saws 2, and spreader mechanism associated with the saws 2. The saws 2 shown in the upper portion of Fig. 1 are rigidly secured to the arbor 4 in any suitable manner as by means of one or more keys coacting with the saw collars. The saws 2 shown in the lower portion of Fig. 1, are laterally slidable or adjustable along the arbor 4 by virtue of one or more splines 25 or similar connections between the saw supporting collars 15' and the arbor 4.

The rift splitter mechanism forming part of the present invention comprises two series of splitter or spreader blades 3, 13, of which the blades 3 are located rearwardly of and are adjustable simultaneously with the laterally movable saws 2, while the blades 13 are located rearwardly of and are adjustably fastened in alinement with the laterally lel to the arbor 4. The spreader blades 13 are rigidly attached to bearings 19 by means of brackets 22, the bearings 19 being laterally adjustable along guide rods 10 rigidly mounted in the frame 5 and extending parallel to the armor 4. The spreader blades 13 are rigidly attached to hubs 20 which embrace the rear guide rod 10 and which are locked to this guide rod by means of set screws or other locking devices. The spreader blades 3, 13 have their upper extremities connected by means of tie rods 16 and are properly spaced apart by spacers 21 embracing these tie rods. The lower portions of the spreader blades 3, 13 are likewise connected by means of tie rods 17 which are embraced by spacers 21 for properly locating the blades in alinement with their respective saws 2. The lumber delivered from the saws 2 passes through the spaces between the adjacent splitter blades 3, 13 and the tie rods 16, 17 and is thus prevented from binding against the saw blades.

The parallel guide rods 10 are preferably located on opposite sides of the vertical longitudinal plane of the axis of the arbor 4, and the bearings 19 which cooperate with the guide rods 10 are interconnected by means of a laterally shiftable saw and splitter adjusting frame 7. The end portions of the frame 7 rest upon parallel supporting guides comprising channel bars 11 rigidly attached to the frame 5, and the medial portion of the frame 7 is formed to engage an end recess in the saw supporting collars 15 of the laterally movable saws 2. A cap 26 pivotally secured to the adjusting frame 7 permits quick release of the connection between the frame 7 and the laterally movable saw collar 15. Mounted in the lower portion of the frame 5 and extending transversely of the saw arbor 4, is a saw and splitter actuating or shifting shaft 8. This actuating shaft 8 is provided with levers 9 located closely adjacent to the respective guide rods 10. The upper swinging ends of the levers 9 are connected to the laterally shiftable bearings 19 by means of adjustable connections 14. The forward end of the actuating shaft 8 is provided with an actuating lever 12 having a latch 23 cooperable with a stationary locking segment or plate 24 for locking the laterally movable saws 2 and splitter blades 3 in adjusted position.

During normal operation of the machine, the saws 2 are being rotated in an anti-clockwise direction as viewed in Fig. 2, and the material which is to be sawed into boards is fed past the saw blades and through the spaces between the splitter blades 3, 13 by means of the feed roller 6. As the sawed material leaves the saws 2, the blades 3, 13 enter the saw cuts and prevent the sawed material from binding against the saw blades. The splitter blades 3, 13 should be in perfect alinement with the adjacent saw blades and adjustment thereof to insure such alinement is readily permitted. In the case of the laterally immovable saws 2 and splitter blades 13, the supporting hubs 20 are adjustable along the guide shaft 10 in order to insure proper alinement of the saws 2 and blades 13. The laterally movable splitter blades 3 are likewise adjustable to insure alinement with the adjacent saws 2, by virtue of the adjustable connections 14.

The laterally adjustable saws 2 and the splitter blades 3 are moreover simultaneously shiftable to vary the gap between the two sets of saws 2 and splitter blades 3, 13, by virtue of the adjusting shaft 8 and the connections associated therewith. Upon release of the lock afforded by the locking plate 24 and the locking latch 23, the shaft 8 may be rotated with the aid of the operating lever 12 to cause the levers 9 to swing in the desired direction of adjustment. Such motion of the levers 9 is transmitted to the connecting bracket 7 through the connections 14, causing this bracket to move along the guide rods 10 and the channel guides 11 and to simultaneously move the interconnected saw collars 15 and the splitter blades 3. The movable saw collars 15 carry the adjacent saws 2 with them, while the splines 25 permit lateral adjustment of the collars without interrupting the driving connection between the arbor 4 and the saws 2. When the desired lateral adjustment of the saws 2 and splitter blades 3 has been effected, these elements may again be locked in position with the aid of the latch 23 and the plate 24.

It will be noted that by supporting the adjusting bracket 7 on opposite sides of the vertical longitudinal plane of the arbor 4, a rigid support for the adjusting bracket 7 is secured. The adjusting mechanism does not interfere with normal operation of the saws and the saws may be readily released for replacement by virtue of the cap 26 and the removability of the bracket 7. The entire mechanism is simple and rigid in its construction and is readily attachable without alteration, to most of the standard gang circular saws.

It should be understood that it is not desired to limit the invention to the exact details of construction and of operation herein shown and described, for various modifications within the scope of the claims may occur to persons skilled in the art.

It is claimed and desired to secure by Letters Patent:

1. In combination, an arbor, a circular saw, a collar supporting said saw for movement along said arbor, stationary supports located on opposite sides of the vertical plane of the axis of said arbor, a guide rod located adjacent to the side of each of said supports remote from said arbor, a saw shifting frame engaging said collar, said frame resting on said supports and slidably engaging said rods, means for moving said frame, and a splitter rigidly associated with said frame in the plane of and closely adjacent to said saw.

2. In combination, an arbor, a gang of circular saws, a collar supporting said saws for movement along said arbor, stationary supports located on opposite sides of the vertical plane of the axis of said arbor, a guide rod located adjacent to the side of each of said supports remote from said arbor, and beyond the peripheries of said saws a saw shifting frame engaging said collar, said frame resting on said supports and slidably engaging said rods, means for moving said frame, and a splitter rigidly associated with said frame in the plane of and closely adjacent to each of said saws.

In testimony whereof, the signature of the inventor is affixed hereto.

WILLIAM G. HAGMAIER.

Certificate of Correction.

It is hereby certified that in Letters Patent No. 1,574,423, granted February 23, 1926, upon the application of William G. Hagmaier, of West Allis, Wisconsin, for an improvement in "Rift Splitters," errors appear in the printed specification requiring correction as follows: Page 3, line 6, claim 2, after the word "arbor" strike out the comma and insert the same to follow after the word "saws" in line 7, same claim; and that the said Letters Patent should be read with these corrections therein that the same may conform to the record of the case in the Patent Office.

Signed and sealed this 13th day of April, A. D. 1926.

[SEAL.]

M. J. MOORE,
*Acting Commissioner of Patents.*